(12) United States Patent
Shigeta

(10) Patent No.: US 11,783,665 B2
(45) Date of Patent: *Oct. 10, 2023

(54) TABLE GAME MANAGEMENT SYSTEM AND GAME TOKEN

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,679

(22) Filed: Oct. 18, 2021

(65) Prior Publication Data

US 2022/0036688 A1     Feb. 3, 2022

Related U.S. Application Data

(63) Continuation of application No. 16/506,346, filed on Jul. 9, 2019, now Pat. No. 11,183,006, which is a (Continued)

(30) Foreign Application Priority Data

Nov. 19, 2015    (JP) .................................. 2015-240631

(51) Int. Cl.
    *G07F 17/32*       (2006.01)
    *A63F 3/00*        (2006.01)
    (Continued)

(52) U.S. Cl.
    CPC ............ *G07F 17/322* (2013.01); *A44C 21/00* (2013.01); *A63F 1/14* (2013.01); *A63F 1/18* (2013.01);
    (Continued)

(58) Field of Classification Search
    CPC .... A63F 9/24; A63F 1/18; A63F 2003/00164; A63F 2009/2419; A63F 2011/0006;
    (Continued)

(56) References Cited

U.S. PATENT DOCUMENTS 3,968,582 A     7/1976   Jones
3,983,646 A    10/1976   Howard
(Continued)

FOREIGN PATENT DOCUMENTS

JP     S64-500243 A     2/1989
JP     03-102917 U1    10/1991
(Continued)

OTHER PUBLICATIONS

Korean Office Action dated Feb. 21, 2022 issued in KR Application 10-2020-7034489 cites the patent documents above.
(Continued)

*Primary Examiner* — Malina D. Blaise
(74) *Attorney, Agent, or Firm* — NORTON ROSE FULBRIGHT US LLP

(57) ABSTRACT

A detection system according to the present invention includes a control device that detects fraud conducted on a game table by using the image analysis result obtained by an image analysis device. In addition, each game token used in this detection system has a multilayer structure having plastic layers with a plurality of different colors stacked on each other, with a colored layer being provided at least intermediately, and white layers or light-colored layers (not illustrated, but may be any layers lighter in color than the colored layer) being stacked on two sides of the intermediate colored layer. As described above, this game token has a multi-layer structure including the colored layer, with the white layers or light-colored layers (not illustrated, but may (Continued)

be any layers lighter in color than the colored layer) being stacked on the two sides of the intermediate colored layer.

11 Claims, 8 Drawing Sheets

Related U.S. Application Data continuation of application No. 15/785,788, filed on Oct. 17, 2017, now Pat. No. 10,398,202, which is a continuation of application No. PCT/JP2016/084180, filed on Nov. 17, 2016.

(51) Int. Cl.

| | | |
|---|---|---|
| A44C 21/00 | (2006.01) | |
| A63F 1/14 | (2006.01) | |
| A63F 1/18 | (2006.01) | |
| A63F 11/00 | (2006.01) | |
| B42D 25/382 | (2014.01) | |
| G06K 19/04 | (2006.01) | |
| A63F 9/24 | (2006.01) | |

(52) U.S. Cl.
CPC ...... *A63F 3/00157* (2013.01); *A63F 11/0002* (2013.01); *B42D 25/382* (2014.10); *G06K 19/047* (2013.01); *G07F 17/32* (2013.01); *G07F 17/3241* (2013.01); *G07F 17/3248* (2013.01); *A63F 2003/00164* (2013.01); *A63F 2003/00835* (2013.01); *A63F 2003/00892* (2013.01); *A63F 2009/2419* (2013.01); *A63F 2009/2489* (2013.01); *A63F 2011/0006* (2013.01); *A63F 2250/58* (2013.01); *G07F 17/3293* (2013.01)

(58) Field of Classification Search
CPC ......... A63F 3/00157; A63F 2009/2489; G07F 17/32; G07F 17/3241
See application file for complete search history.

(56) References Cited

U.S. PATENT DOCUMENTS

| | | | |
|---|---|---|---|
| 4,026,309 A | 5/1977 | Howard | |
| 4,814,589 A * | 3/1989 | Storch | G06K 19/04 211/49.1 |
| 5,361,885 A * | 11/1994 | Modler | G07F 17/3248 40/27.5 |
| 5,651,548 A | 7/1997 | French et al. | |
| 5,673,503 A | 10/1997 | Redleman | |
| 5,757,876 A | 5/1998 | Dam et al. | |
| 5,794,532 A | 6/1998 | Gassies et al. | |
| 5,781,647 A | 7/1998 | Fishbine et al. | |
| 5,941,769 A | 8/1999 | Order | |
| 6,514,374 B1 | 2/2003 | Zurawski et al. | |
| 6,532,297 B1 * | 3/2003 | Lindquist | G07D 5/005 205/582 |
| 7,771,272 B2 | 8/2010 | Soltys et al. | |
| 8,016,665 B2 | 9/2011 | Gururajan et al. | |
| 2002/0024439 A1 * | 2/2002 | Kawai | G06K 19/07745 340/568.1 |
| 2002/0042298 A1 * | 4/2002 | Soltys | G06Q 10/0639 463/29 |
| 2002/0167446 A1 * | 11/2002 | Goto | H01Q 21/30 343/702 |
| 2003/0220136 A1 | 11/2003 | Soltys et al. | |
| 2004/0219975 A1 | 11/2004 | Soltys et al. | |
| 2005/0012270 A1 | 1/2005 | Schubert et al. | |
| 2005/0026680 A1 * | 2/2005 | Gururajan | G07F 17/32 463/25 |
| 2005/0051965 A1 * | 3/2005 | Gururajan | G07F 17/32 273/292 |
| 2005/0240871 A1 * | 10/2005 | Wilson | G06V 10/245 715/700 |
| 2006/0019739 A1 * | 1/2006 | Soltys | G07F 17/3241 463/25 |
| 2006/0160608 A1 | 7/2006 | Hill et al. | |
| 2006/0199649 A1 * | 9/2006 | Soltys | G06Q 10/0639 463/47 |
| 2006/0252233 A1 * | 11/2006 | Honma | H01L 21/67132 438/464 |
| 2006/0252521 A1 * | 11/2006 | Gururajan | G07F 17/322 463/29 |
| 2006/0287068 A1 * | 12/2006 | Walker | G07F 17/32 463/25 |
| 2007/0015583 A1 * | 1/2007 | Tran | G07F 17/32 463/40 |
| 2007/0060311 A1 | 3/2007 | Rowe et al. | |
| 2007/0111773 A1 * | 5/2007 | Gururajan | G07F 17/3202 463/11 |
| 2007/0184898 A1 * | 8/2007 | Miller | G07D 9/002 463/29 |
| 2008/0113783 A1 | 5/2008 | Czyzewski et al. | |
| 2009/0075725 A1 * | 3/2009 | Koyama | G07F 17/322 463/25 |
| 2009/0115133 A1 * | 5/2009 | Kelly | A63F 3/00643 273/274 |
| 2010/0029380 A1 * | 2/2010 | Rhoads | A63F 13/45 463/43 |
| 2010/0105486 A1 * | 4/2010 | Shigeta | A44C 21/00 463/47 |
| 2010/0113118 A1 * | 5/2010 | Shigeta | G07F 17/3251 29/592.1 |
| 2010/0227672 A1 * | 9/2010 | Amour | G06Q 20/108 463/25 |
| 2010/0240446 A1 | 9/2010 | Koyama et al. | |
| 2011/0018715 A1 * | 1/2011 | Lee | G06K 19/047 340/572.7 |
| 2011/0052049 A1 * | 3/2011 | Rajaraman | G06T 7/12 382/165 |
| 2012/0252564 A1 | 10/2012 | Moore et al. | |
| 2013/0316797 A1 * | 11/2013 | Gelinotte | G07F 17/3244 463/25 |
| 2014/0291399 A1 | 10/2014 | Koayama | |
| 2014/0332595 A1 * | 11/2014 | Moreno | G07F 7/02 235/488 |
| 2014/0357361 A1 * | 12/2014 | Rajaraman | G07F 17/323 463/31 |
| 2015/0087417 A1 | 3/2015 | George et al. | |
| 2015/0189239 A1 | 7/2015 | Zhao et al. | |
| 2015/0288874 A1 * | 10/2015 | Sivan | G06T 7/97 348/207.11 |
| 2015/0312517 A1 | 10/2015 | Hoyt et al. | |
| 2015/0338915 A1 * | 11/2015 | Publicover | G06F 3/0304 345/633 |
| 2015/0363670 A1 * | 12/2015 | Sugishita | G06V 20/52 382/218 |
| 2016/0098606 A1 | 4/2016 | Nakamura et al. | |
| 2016/0110642 A1 | 4/2016 | Matsuda et al. | |
| 2017/0039807 A1 * | 2/2017 | Shigeta | G07F 17/3251 |
| 2018/0114406 A1 | 4/2018 | Shigeta | |
| 2018/0350191 A1 | 12/2018 | Shigeta | |

FOREIGN PATENT DOCUMENTS

| | | |
|---|---|---|
| JP | H04286163 A | 10/1992 |
| JP | H06-134140 A | 5/1994 |
| JP | H10508236 A | 8/1998 |
| JP | 2000-259796 A | 9/2000 |
| JP | 2002-007989 A | 1/2002 |
| JP | 2008-077140 A | 4/2008 |
| JP | 2009-066172 A | 4/2009 |
| JP | 2009-066173 A | 4/2009 |
| JP | 2009066173 A | 4/2009 |
| JP | 2010213940 A | 9/2010 |
| JP | 2011-067339 A | 4/2011 |
| JP | 2011-106899 A | 6/2011 |
| JP | 2013-198626 A | 10/2013 |
| JP | 2014095974 A | 5/2014 |

(56) References Cited

FOREIGN PATENT DOCUMENTS

| JP | 2014-140576 A | 8/2014 |
|---|---|---|
| JP | 2014-203139 A | 10/2014 |
| JP | 2015014819 A | 1/2015 |
| JP | 2015198935 A | 11/2015 |
| JP | 2014229124 A1 | 4/2016 |
| SG | 11201709269 A | 12/2017 |
| WO | 03082420 A1 | 10/2003 |
| WO | 2003082420 A1 | 10/2003 |
| WO | 2004112923 A1 | 12/2004 |
| WO | 2005110564 A2 | 11/2005 |
| WO | 2014182306 A1 | 11/2014 |
| WO | 2014210368 A1 | 12/2014 |
| WO | 2015-107902 A1 | 7/2015 |
| WO | 2015096677 A1 | 7/2015 |
| WO | 2017022673 A1 | 2/2017 |

OTHER PUBLICATIONS

Australian Office Action dated Mar. 7, 2022 issued in AU Application 2020205218 cites the patent documents above.
Japanese Office Action dated Jul. 16, 2019 for Corresponding Japanese patent application No. 2016-236224.
European Search report dated Jun. 4, 2019 for EP patent application 16866414.2.
Korean Office Action dated Apr. 15, 2019 for KR patent application 10-2018-7014097.
Examination Report No. 1 dated Dec. 20, 2017 for Australian patent application 2016356234.
International Search Report (PCT/ISN210) dated Oct. 25, 2016 for corresponding PCT Application PCT/JP2016/072673 cites the foreign patent documents above.
International Search Report (PCT/ISN210) dated Oct. 25, 2016 for corresponding PCT Application PCT/JP2016/072360 cites the US and foreign patent documents above.
International Search Report (PCT/ISA/210) dated Feb. 7, 2017 for corresponding PCT Application PCT/JP2016/084179 cites the US and foreign patent documents above.
International Search Report (PCT/ISA210) dated Oct. 3, 2017 for corresponding PCT Application PCT/JP2017/025796 cites the US and foreign patent documents above.
International Search Report (PCT/ISA210) dated Oct. 10, 2017 for corresponding PCT Application PCT/JP2017/032692 cites the US and foreign patent documents above.
Search Report dated Sep. 13, 2018 for Singapore patent application 11201804189W.
Chinese Office Action dated Mar. 4, 2020 issued in corresponding CN Application 201680022511.0 cites the patent document above.
Australian Examination Report No. 2 dated Nov. 30, 2020 issued in AU Application 2018250362 cites the patent document above.
Australian Examination Report No. 3 dated Dec. 16, 2020 issued in AU Application 2018250362 cites the patent document above.
Australian Examination Report No. 1 dated Feb. 12, 2021 issued in AU Application 2020205219 cites the patent document above.
Japanese Office Action dated Dec. 13, 2022 issued in JP Application 2021-167339.
Filipino Office Action dated Feb. 2, 2023 issued in PH Application 1-2018-501078.
Japanese Office Action dated Feb. 28, 2023 issued in JP Application 2022-076668.
New Zealand Office Action dated Apr. 14, 2023 issued in NZ Application 757962.
Seesaa Inc., "How to buy and redeem chips in Korean casinos", URL, http://korearealization.seesaa.net/upload/detail/image/imgres15-thumbnail2.jpg.html, published on Jun. 5, 2013.
Japanese Office Action dated May 16, 2023 issued in JP Application 2021-167339.
Japanese Office Action dated Aug. 15, 2023 issued for JP Application No. 2022-076668.

* cited by examiner

TABLE GAME MANAGEMENT SYSTEM AND GAME TOKEN

CROSS-REFERENCE TO RELATED APPLICATIONS

This application is a continuation of U.S. patent application Ser. No. 16/506,346 filed Jul. 9, 2019, which is a continuation of U.S. patent application Ser. No. 15/785,788 filed Oct. 17, 2017 (now U.S. Pat. No. 10,398,202), which is a continuation of Int'l Pat. App. No. PCT/JP2016/084180 filed Nov. 17, 2016, which claims priority to JP Pat. App. No. 2015-240631 filed Nov. 19, 2015, the entire contents of each of which is specifically incorporated by reference herein without disclaimer.

TECHNICAL FIELD

The present invention relates to a table game management system in a game hall.

BACKGROUND ART

In game halls such as casinos, various attempts have been made to prevent dealers from mishandling game tokens (chips). Game halls are equipped with surveillance cameras for monitoring the mishandling of chips by dealers to, for example, determine mishandling and fraud in collecting game tokens and distributing game tokens as a reward contradicting win-loss results on the basis of images obtained from the surveillance cameras, thereby preventing mishandling and fraud.

On the other hand, there has been proposed a technique of grasping the number and total amount of bet game tokens by attaching an IC tag to each game token to grasp the amount of the game token.

The card game monitoring system disclosed in WO 2015/107902 is designed to determine whether the game tokens placed on a game table have been collected or distributed as a reward according to win-loss results, by image analysis of the movements of the game tokens, thereby monitoring the mishandling of chips by the dealer.

In a game hall such as a casino, game tokens are stacked so high on a game table that the IC tag reader provided below the game table cannot correctly read the total amount of the tokens. Increasing the sensitivity of the reader will add together the amounts of game tokens placed at different positions (a win or loss depends on each position), thus leading to a failure to grasp the total amount of game tokens at each position. In addition, conventionally, as illustrated in FIG. 2, a game token (chip) T has a complex design. Stacking a large number of such chips makes it impossible to correctly grasp the number of stacked chips with a camera.

Furthermore, fraud on a game table is so sophisticated that it is not possible to find, for example, fraud made in a sophisticated way of betting by, for example, simply detecting that the amount won on a certain game table is large with a camera, thus posing a new problem.

Moreover, a dealer needs to collect game tokens and distribute game tokens as a reward placed on a game table according to win-loss results. Assume that this operation is determined by image analysis. In this case, because each game token (chip) has a complex design, it is not possible with any existing practical image analysis technique to determine whether the dealer has performed correct distribution for a reward when distributing chips as a reward corresponding to bet chips, thus resulting in the problem of insufficient prevention of mishandling.

SUMMARY OF INVENTION

In order to solve the various problems described above, a table game management system according to the present invention includes a card distributor that determines and displays a win-loss result on each game on a game table, a measurement device that measures types and number of game tokens placed on the game table, and a management control device that identifies and stores positions, types, and number of game tokens placed on the game table by a game participant by using a measurement result obtained by the measurement device in each game, wherein the game token has a multi-layer structure having plastic layers with a plurality of different colors stacked on each other, with a colored layer being provided at least intermediately, and white layers or light-colored layers being stacked on two sides of the intermediate colored layer, so as to be configured to form a striped pattern on a side surface in a stacking direction and allow identification of the type of game token according to the colored layer, and the management control device has a calculation function of determining participants in each game as a winner and a loser by using a win-loss result obtained from the card distributor and a measurement result on the positions, types, and number of game tokens placed by the game participants, and performing casino-side balance calculation on the game table for each game.

In addition, in the management system, the management control device is configured to have a function of determining the number of game tokens by measuring the number of colored layers, white layers, or light-colored layers of game tokens placed by each game participant.

In order to solve the various problems described above, a game token according to the present invention includes an arrangement having plastic layers with a plurality of different colors stacked on each other, with a colored layer being provided at least intermediately, and white layers or light-colored layers being stacked on two sides of the colored layer, so as to form a striped pattern on a side surface in a stacking direction and allow identification of the type of game token according to the colored layer.

In addition, the game token has a print indicating the type of game token provided on a surface of the white layer or the light-colored layer, and a transparent layer is provided on an outermost layer, with the layers being bonded to each other by thermal compression to form at least a five-layer structure.

Furthermore, the game token may be configured such that a mark formed by UV ink or carbon black ink is provided on a surface of the white layer or the light-colored layer, that the transparent layer on the outermost layer is embossed, that R chamfering is provided to an edge of the transparent layer on the outermost layer, that the colored layer includes a plurality of layers, or that the colored layer incorporates an RFID.

In order to solve the various problems described above, an inspection apparatus that inspects a game token according to the present invention includes a path including an inlet and an outlet through which a game token is allowed to pass in a radial direction, a chip type determination device that determines the color of a striped pattern on a side surface of a game token in a stacking direction by shooting the game token passing through the path, a mark reader that reads a mark formed by UV ink or carbon black ink and provided on a surface of a passing game token, a print inspection device that reads a print indicating a type, which is provided on a surface of a game token, from a direction perpendicular to the path, and a control device for the overall apparatus, wherein the control device is configured to inspect whether a chip type determined by the chip type determination device matches information of the print indicating the type obtained from the print inspection device.

A system according to the present invention allows determination of the number of game tokens (chips) by image analysis even if a large number of chips are stacked on each other, and can grasp the total amount of game tokens stacked relatively high on the basis of the position and the colors.

DESCRIPTION OF EMBODIMENTS

Figure 1:
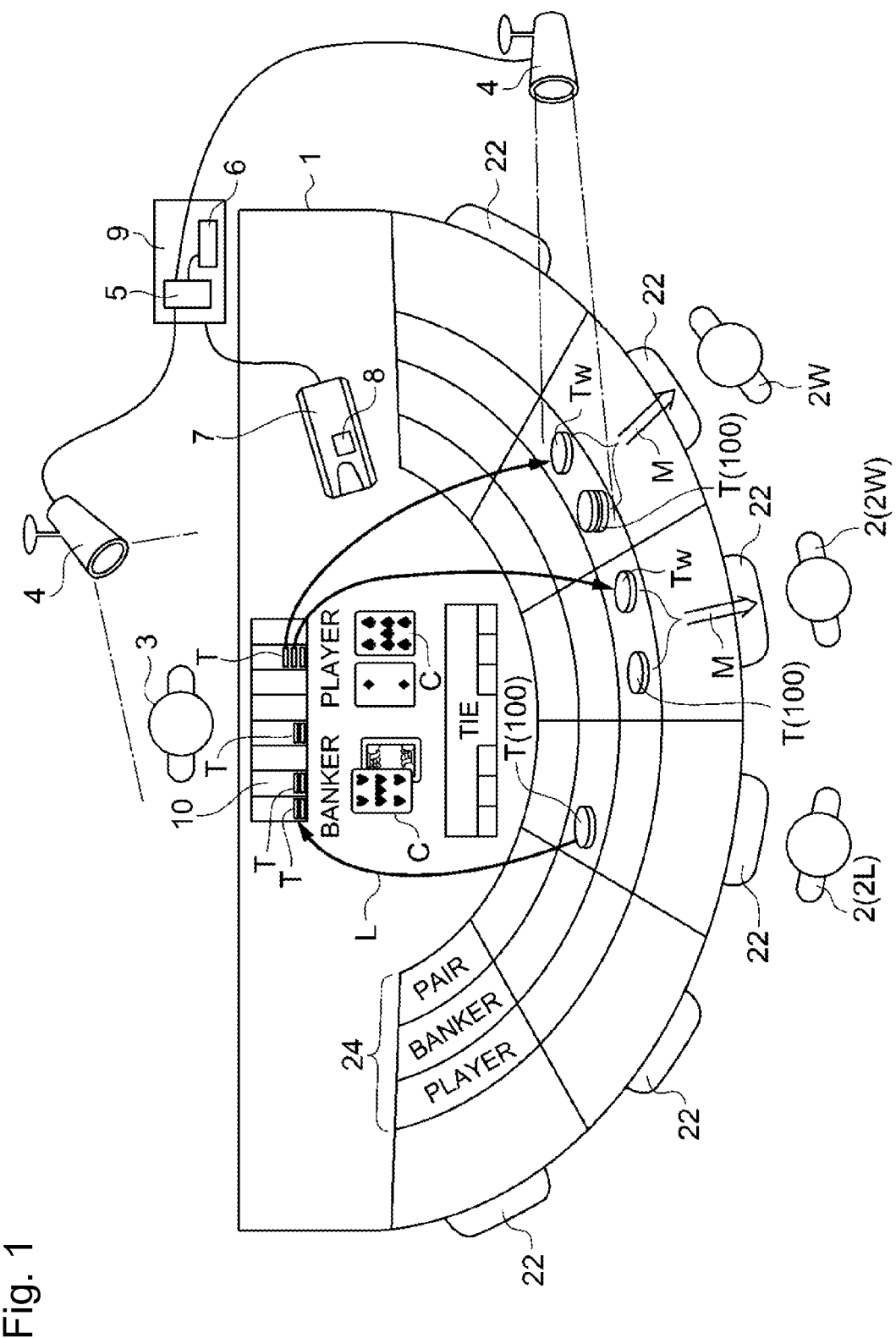
FIG. 1 is a plan view illustrating an outline of an overall table game management system in a game hall according to an embodiment of the present invention.

A table game management system in a game hall having game tables according to an embodiment of the present invention will be described below. FIG. 1 illustrates an overall outline of the system. The table game management system in a game hall having a plurality of game tables 1 includes a measurement device 6 including an image analysis device 5 that records the progress state of a game played on the game table 1, including game participants 2 and a dealer 3, as a video, via a plurality of cameras 4, and also performs image analysis on the recorded video of the progress state of the game, and a card distributor 7 that determines and displays win-loss results on each game on the game table 1. The card distributor 7 has been used and known by a person skilled in the art. The card distributor is a so-called electronic shoe, in which game rules are programmed in advance to determine a win or loss on the game by reading the information (rank and suite) of a distributed card C. In playing the Baccarat game, a banker's win, player's win, and tie (draw) are basically determined on the basis of the ranks of two or three cards, and a display lamp 8 displays the determination results (win-loss results).

A management control device 9 reads the information (rank and suite) of the card C obtained from the card distributor 7 and determines a win-loss result on each game. The management control device 9 also determines winners 2W and a loser 2L of the participants 2 in each game by using measurement results on the positions, types, and number of game tokens 100 (chips T) placed by the game participants 2. The management control device 9 also has a calculation function of calculating, for each game, a casino-side balance on the game table 1 (the amount obtained by subtracting the total amount of the game tokens 100 (chips T) distributed as a reward to the winners 2W of the participants 2 from the total amount of the game tokens 100 (chips T) bet by the loser 2L).

The image analysis device 5, the measurement device 6, and the management control device 9 in this detection system each have a composite structure including a computer, program, and memory in an integrated or discrete form.

Figure 3:
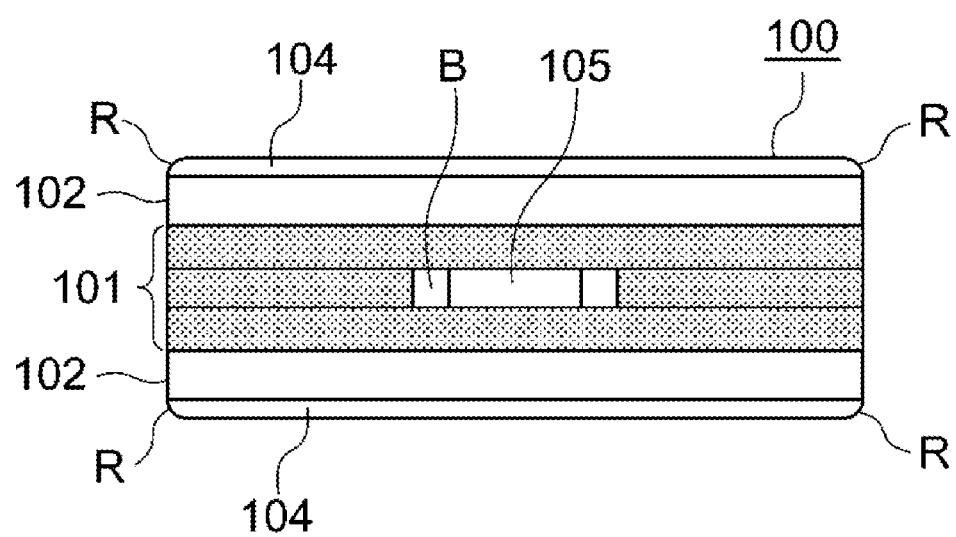
FIG. 3 is a front sectional view of a game token according to the embodiment of the present invention.
Figure 5A:
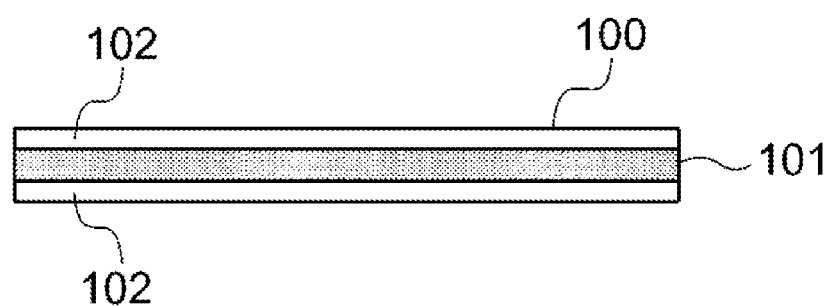
FIG. 5A is a front view of a game token according to the embodiment of the present invention.

A game token (chip) used in this detection system will be described in detail next. FIG. 3 is a front sectional view of the game token (chip T) 100 used in the detection system. This game token has a multi-layer structure having a plurality of plastic layers with a plurality of different colors stacked on each other. This multi-layer structure includes a colored layer 101 provided at least intermediately, with white layers 102 or light-colored layers (although not illustrated, any layers lighter in color than the colored layer 101) being stacked on the two sides of the colored layer 101. As described above, the game token includes the colored layer 101 and has the white layers 102 or light-colored layers (although not illustrated, any layers lighter in color than the colored layer 101) stacked on the two sides of the colored layer 101, thus forming a multi-layer structure. As illustrated in FIG. 5A, this forms a striped pattern on a side surface in the stacking direction. Changing the color of the colored layer 101 (to red, green, yellow, blue, or the like) makes it possible to identify the type of game token 100 (for example, 10 points, 20 points, 100 points, and 1000 points).

Figure 5B:
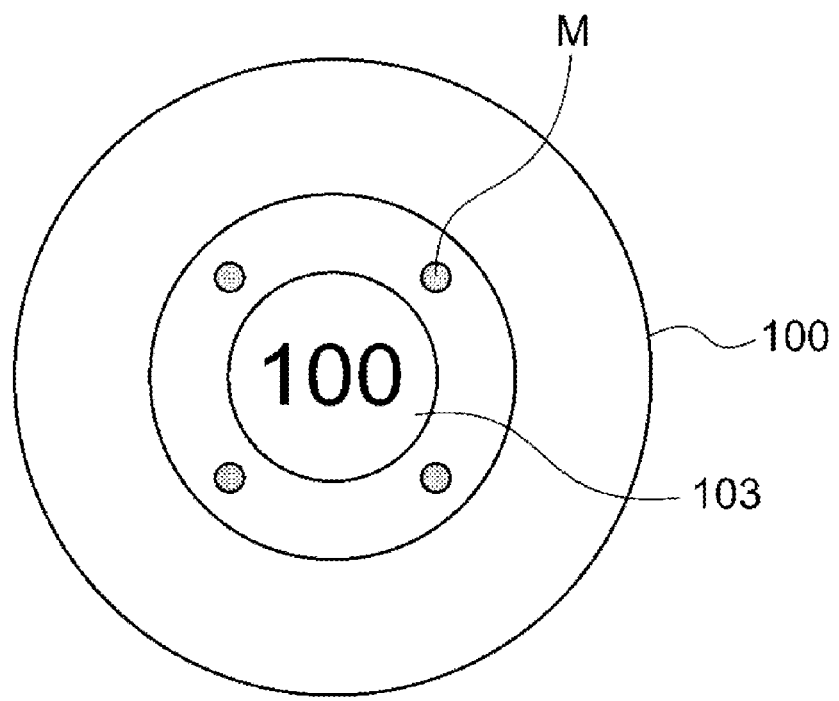
FIG. 5B is a plan view of a game token according to the embodiment of the present invention.
Figure 6:
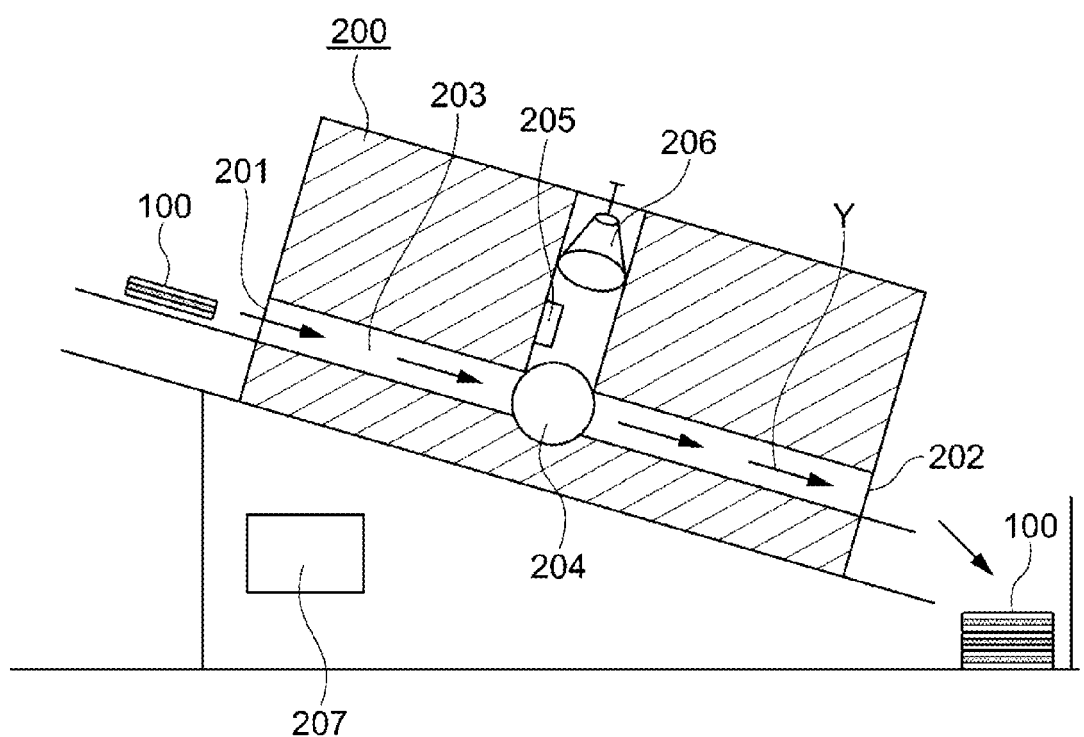
FIG. 6 is a side sectional view of an inspection apparatus for game tokens according to the embodiment of the present invention.
Figure 7:
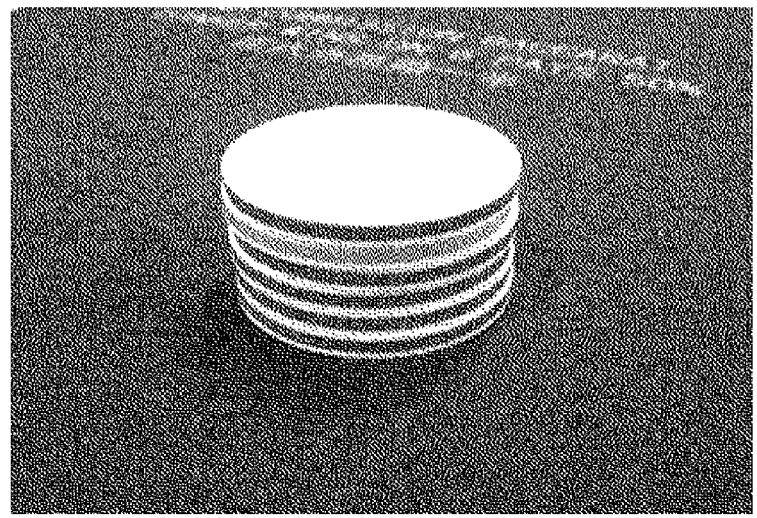
FIG. 7 is a perspective photographic view for explaining a stacked state of different types of game tokens according to the embodiment of the present invention.

In addition, as illustrated in FIG. 5B, prints 103 (indicating 100 points or the like) indicating the type of game token 100 are formed on the surfaces (upper and lower surfaces) of the white layer 102 of the game token 100, and transparent layers 104 are provided on the outermost layers. The respective layers are bonded to each other by thermal compression to form at least a five-layer structure. Each game token 100 is formed by bonding the respective layers (the colored layer 101, the white layers 102, and the transparent layers 104), each formed from an elongated plastic material, by thermal compression into a tightly bonded structure (for example, a five-layer structure) and then punching it into, for example, a circular or rectangular shape using a press or like. When this structure is punched by a press, the dimensions of the die and punch used for punching are designed to provide R chamfering (round edges) to the edges of the transparent layers 104 on the outermost layers.

In addition, the surfaces of the white layer 102 of the game token 100 are provided with marks M printed by UV ink or carbon black ink. The marks M authenticate the game token 100. The marks M are visible when irradiated with ultraviolet light (or infrared light). A combination of the shape and number of such marks implements authentication. The transparent layers 104 are formed on the outermost layers by thermal compression bonding or a coating process (application) so as to cover the prints 103 and the marks M. The transparent layers 104 are embossed to prevent the game tokens 100 from clinging to each other.

The edges of the transparent layers 104 on the outermost layers, which are provided with the prints 103 (indicating 100 points or the like), are R-chamfered (R) to prevent the surfaces of the white layers 102 from being deformed and exposed from the side surface in a punching process for the game token 100. This also prevents the game token 100 from damaging the hands and other chips T with sharp edges that are left unchamfered.

As illustrated in FIG. 3, the colored layer 101 may be formed from a plurality of colored layers (three layers in FIG. 3). Because the plurality of colored layers (three layers in FIG. 3) are bonded to each other by thermal compression, the three-layer structure cannot be visually recognized unlike in FIG. 3. That is, FIG. 3 illustrates the three layers for the sake of descriptive convenience. In addition, a hollow portion B is provided in part of the intermediate layer of the three layers of the colored layer 101, and an RFID is embedded in the hollow portion.

The management control device 9 captures images of the game tokens 100 placed by the participants 2 in a game on the game table 1 by using the camera 4, and performs measurement for each area 24, on which the game tokens are placed, (to detect whether the participant has bet on the banker, player, pair ("PAIR"), or tie ("TIE")) by using the measurement device 6 including the image analysis device 5. In addition, the management control device 9 determines the types and number of game tokens 100 (chips T) stacked on each area by causing the measurement device 6 (using the information obtained by the image analysis device 5) to analytically measure the number and colors of the colored layers 101 (or light-colored layers) or the white layers 102 of the game tokens 100.

The management control device 9 may be a control device using artificial intelligence or having a deep learning structure. The management control device 9 can grasp, via the camera 4 and the image analysis device 5, the positions 24 (each position indicating whether the corresponding participant has bet on the player, banker, or pair), types (different amounts are assigned to the game tokens 100 for the respective colors), and numbers of game tokens T bet by the respective participants 2. A computer or control system using artificial intelligence and a deep learning (structure) technique can grasp the positions 24 (each position indicating whether the corresponding participant has bet on the player, banker, or pair), types (different amounts are assigned to the game tokens for the respective colors), and numbers of the game tokens T by using a self-learning function or the like. This allows the management control device 9 to determine, on the basis of analysis on each video indicating the progress state of each game via the image analysis device 5, whether the game token 100 bet by the participant 2L who has lost the game has been properly collected (indicated by an arrow L) and the game tokens 100 have been properly distributed as a reward to the participants 2W who have won the game in accordance with the win-loss results on the game determined by the card distributor 7.

Figure 2:
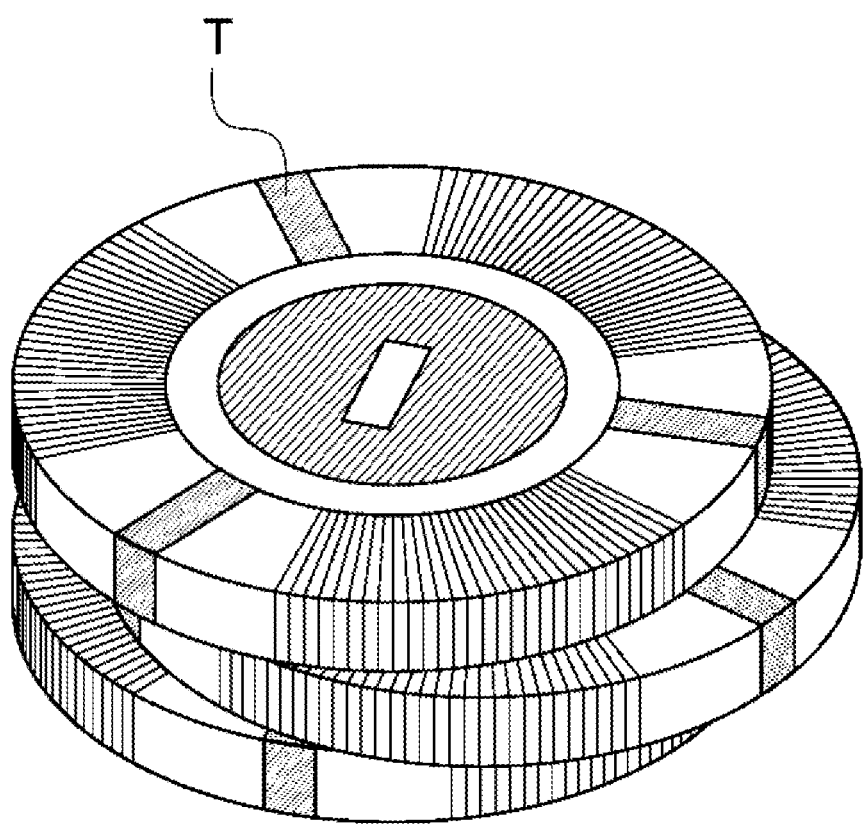
FIG. 2 is a perspective view of conventional game tokens.
Figure 4:
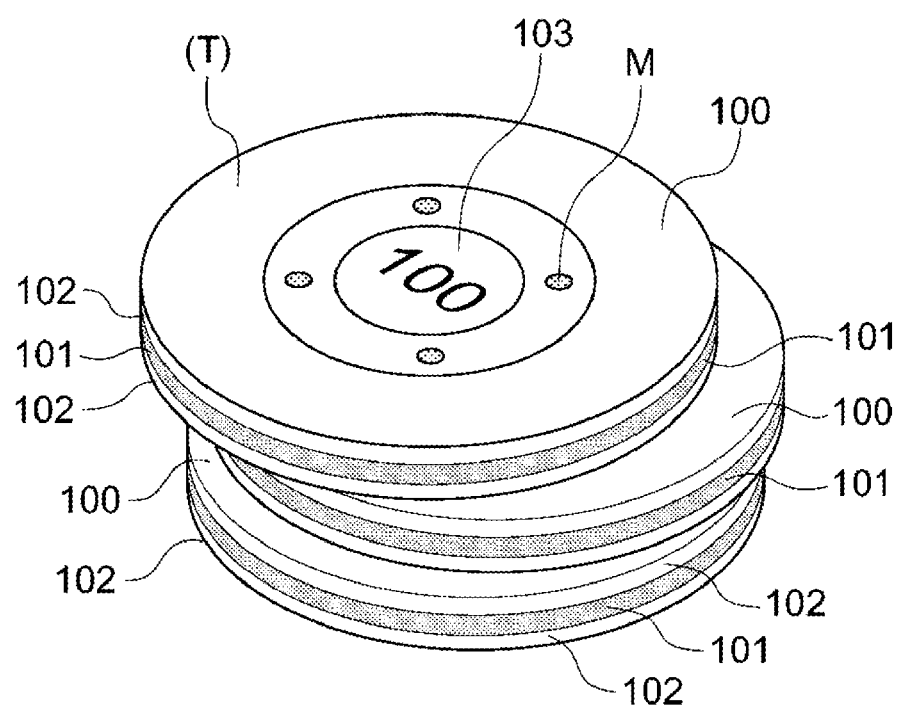
FIG. 4 is a perspective view illustrating a stacked state of game tokens which is grasped according to the embodiment of the present invention.

In such a case, as illustrated in FIG. 4, each chip has a multilayer structure having stacked layers (as compared with the conventional chip illustrated in FIG. 2), with a stripe pattern being sharply formed on the side surface in the stacking direction, and hence the measurement device 6 including the image analysis device 5 can easily and correctly measure the types and number of chips. In addition, using a computer or control system using artificial intelligence or a deep learning (structure) technique makes it possible to implement more correct image analysis and determination. Because the computer or control system using artificial intelligence and the deep learning (structure) technique have already been known by a person skilled in the art, and are available, a detailed description of them will omitted.

The management control device 9 can analytically grasp the total amount of the game tokens Tin a game token tray 10 of the game table 1 which belongs to the dealer 3 by using the image analysis device 5. After balance settlement at the end of a given game, the management control device 9 can comparatively calculate, on the basis of win-loss results on the game, whether the total amount of the game tokens T in the game token tray 10 has increased or decreased, in accordance with the collection of the game tokens T bet by each participant 2 who has lost the game and a redemption amount TW of the game tokens bet by the game participants 2W who have won the game. Although the total amount of the game tokens Tin the game token tray 10 is always grasped by means such as RFIDs, the management control device 9 determines whether an increase or decrease in the total amount is correct, by analyzing a video representing the progress state of a game via the image analysis device 5. These operations may also be performed by using an artificial intelligence structure or deep learning structure.

The management control device 9 may have an artificial intelligence structure or deep learning structure that can grasp the position of a game token bet at each play position 22 on the game table 1 (each position indicating whether the corresponding participant has bet on the player, banker, or pair) and an amount (the types and number of game tokens), and can extract a peculiar situation (set by the casino) by comparing the win-loss history of each game participant 2 and the obtained amount of game tokens (winning amount) obtained from a win-loss result on each game with the statistical data of many past games (big data). Typically, the management control device 9 having such an artificial intelligence structure or deep learning structure can extract, as peculiar situations, a situation in which a winning amount has exceeded a certain amount (million dollars) and a situation in which the amounts of game tokens lost are small and the amounts of game tokens won are large at a given one of the positions 22 on the game table 1 over several consecutive games as compared with the statistical data (big data or the like) of past games.

The management control device 9 has a structure capable of comparatively calculating the total amount of the game tokens 100 in the game token tray 10 of the game table 1 which belongs to the dealer 3 so as to indicate, after balance settlement of the game tokens 100 bet by the respective participants 2 in each game, whether the calculated increase or decrease in the amount of game tokens corresponds to the balance settlement is correct. In the chip tray 10 for holding the game tokens 100 of the dealer 3 illustrated in FIG. 1, the types and number of game tokens 100 can be determined by causing the measurement device 6 (using the information obtained by the image analysis device 5) to analytically measure the number and colors of the colored layers 101 or white layers 102 of the game tokens 100 (chips T) stacked in the lateral direction. The total amount of the game tokens 100 in the chip tray 10 for holding chips is always (or at predetermined time intervals) grasped in this manner. The management control device 9 has a calculation function of performing, for each game, calculation of the settled amount of each game (casino-side balance calculation on the game table 1 (the amount obtained by subtracting the total amount of game tokens 100 (chips T) distributed as a reward to the winners 2W of the participants 2 from the total amount of game tokens 100 (chips T) bet by the loser 2L)). This makes it possible to always (or at predetermined time intervals) verify the total amount of the game tokens 100 in the game token tray 10. That is, it is verified whether an increase or decrease in the amount of game tokens matches the settled amount of each game on the basis of the image analysis result dealer 3 obtained by the image analysis device 5.

An inspection apparatus 200 that inspects the game token 100 according to the embodiment of the present invention will be described next. The inspection apparatus 200 includes a path 203 having an inlet 201 and an outlet 202 through which the game token 100 can pass in the radial direction (the arrow Y direction). The path 203 is inclined, and the game token 100 passes through the path 203 in the arrow Y direction. The path 203 includes a chip type determination device 204 that determines the color of the striped pattern on the side surface of the game token 100 in the stacking direction by shooting the side surface, a mark reader 205 that reads the marks M printed by UV ink or carbon black ink and provided on the surface of the passing game token 100, a print inspection apparatus 206 that reads the print 103 provided on the surface of the game token from a direction perpendicular to the path 203, and a control device 207 for the overall apparatus. The control device 207 is configured to inspect whether the chip type determined by the chip type determination device 204 matches the information of the print representing a type, which is obtained from the print inspection apparatus 206.

The inspection apparatus 200 can inspect whether each print 103 on the manufactured game token 100 has been properly printed so as to match the chip type represented by the color of the striped pattern on the game token 100.

REFERENCE SIGNS LIST 1, game table
2, player
3, dealer
4, camera
5, image analysis device
6, measurement device
7, card distributor that determines and displays win-loss results on games
9, management control device
10, game token tray
100(T), game token
200, inspection apparatus

The invention claimed is:

1. A system configured to determine a value of each of one or more game tokens that are put on a game table and constitute one or more stacks, wherein each game token has a notation of a value of the game token on a flat surface and has a first color part representing the value by a color thereof and a second color part not representing the value on a side surface, the system comprising:
a camera configured to capture an image of the one or more stacks that include the one or more game tokens put on the game table, the camera positioned diagonally above the game table to capture, for each stack of the one or more stacks, a top and a side of the stack; and
one or more processors configured to, using a deep learning technology:
analyze the image in which the one or more stacks appear; and
for each stack of the one or more stacks, determine, based on the analysis of the image:
a position of the stack placed in a betting area of a plurality of betting areas of the game table, the plurality of betting areas arranged in a depth direction with reference to a field of view of the camera; and
a total value of a set of one or more game token that constitute the stack captured in the image, the total value determined based on a number of game tokens included in the set of one or more game tokens of the stack and based on, for each token of the set of one or more game tokens, a value of the game token determined based on the first color part of the game token.

2. The system according to claim 1, wherein the one or more processors is further configured to determine, based on the analysis of the image, a number of chip stacks of the one or more stacks bet on the game table.

3. The system according to claim 1, wherein the one or more processors is configured to, for each stack of the one or more stacks, determine, based on the analysis of the image:
the number of game tokens included in the set of one or more game tokens of the stack; and
for each game token of the set of one or more tokens, the value of the game token based on the first color part of the game token.

4. The system according to claim 1, wherein the one or more processors is further configured to, for at least one game token of the one or more game tokens, detect the first color part of the at least one game token from the image and determine the value of the at least one game token based on the color of the detected first color part.

5. The system according to claim 1, wherein at least one game token of the one or more game tokens has a pattern in which at least a part of the first color part of the at least one game token is sandwiched by the second color part of the at least one game token on the side surface of the at least one game token.

6. The system according to claim 4, wherein the one or more processors is further configured to determine a number of the one or more game tokens based on a number of the first color parts detected in the image.

7. The system according to claim 1, wherein at least one game token of the set of one or more game tokens of the stack includes has information capable of identifying the value of the at least one game token, the information distinct from the first color part of the at least one game token, the system further comprising:
a reading device configured to read the information from the at least one game token,
wherein the one or more processors is further configured to inspect whether or not the value of the at least one game token read by the reading device matches the value of the at least one game token determined based on the first color part of the at least one game token.

8. The system according to claim 7, wherein the information is stored in a RFID tag embedded in the at least one game token, and the reading device is a RFID reader.

9. The system according to claim 1, wherein the plurality of betting areas are also arranged in a width direction with reference to the field of view of the camera.

10. The system according to claim 9, wherein the one or more processors is further configured to determine, for each stack of the one or more stacks, the position of the stack in the depth direction, the width direction, or a combination thereof.

11. The system according to claim 1, further comprising a plurality of cameras that include the camera, wherein a total number of cameras of the plurality of cameras is fewer than a total number of betting areas of the plurality of betting areas.

* * * * *